United States Patent

Van Zijderveld

[11] 4,326,849
[45] Apr. 27, 1982

[54] SPROCKET-WHEEL GEAR-WHEEL OR LIKE WHEEL SUBSTANTIALLY MANUFACTURED FROM A SYNTHETIC MATERIAL

[75] Inventor: George J. Van Zijderveld, 's-Gravenzande, Netherlands

[73] Assignee: M.C.C. Nederland B.V., 's-Gravenzande, Netherlands

[21] Appl. No.: 85,753

[22] Filed: Oct. 17, 1979

[30] Foreign Application Priority Data

Jul. 26, 1979 [NL] Netherlands ......................... 7905788

[51] Int. Cl.³ ....................... F16H 55/12; F16H 55/48
[52] U.S. Cl. ...................................... 474/161; 74/447; 74/DIG. 10; 403/365; 474/190; 474/197; 474/903; 474/902
[58] Field of Search ............... 474/903, 197, 902, 161, 474/190; 403/356, 362, 365; 74/445, 446, 447, DIG. 10

[56] References Cited

U.S. PATENT DOCUMENTS

| | | | |
|---|---|---|---|
| 1,331,156 | 2/1920 | Johnston et al. | 474/903 |
| 2,489,178 | 11/1949 | Galbreath | 474/902 X |
| 2,932,207 | 4/1960 | Whitney | 474/902 |
| 3,013,440 | 12/1961 | White | 74/446 |
| 3,162,057 | 12/1964 | Burrell | 474/902 X |
| 3,200,665 | 8/1965 | Wells | 74/446 |
| 3,618,411 | 11/1971 | Rottweiler | 474/903 |
| 4,006,993 | 2/1977 | Woerlee | 403/365 |
| 4,078,445 | 3/1978 | Kiser, Jr. | 474/902 |

FOREIGN PATENT DOCUMENTS 7505288 6/1975 Fed. Rep. of Germany .
667737 6/1979 U.S.S.R. ....................... 74/DIG. 10

Primary Examiner—C. J. Husar
Assistant Examiner—Conrad Berman
Attorney, Agent, or Firm—Larson and Taylor

[57] ABSTRACT

A sprocket-wheel, gear-wheel or like wheel, substantially manufactured of a synthetic material, comprising a hub which is divided along a plane which lies perpendicular to the center line of the hub-boring, said hub parts being provided with adjacent recesses for jointly accommodating a toothed ring member and being affixed to one another by bolts or the like to clamp the toothed ring member therebetween.

4 Claims, 3 Drawing Figures

SPROCKET-WHEEL GEAR-WHEEL OR LIKE WHEEL SUBSTANTIALLY MANUFACTURED FROM A SYNTHETIC MATERIAL

The invention relates to a sprocket-wheel, gear-wheel or like wheel substantially manufactured from a synthetic material and comprising a hub and a toothed ring or the like affixed thereto in spaced concentric relationship therewith.

Such wheels, and in particular sprocket-wheels, are applied on a large scale to transportation techniques for driving and guiding transporting chains.

Through such a requirement therefore, wheels having a very wide variety of design of toothed ring with differing diameters are utilized. This implies that many different types of complete wheels must be maintained in stock to afford quick replacement in order that the "out-of-service" period of a transporting equipment requiring such a replacment is as short as possible.

Furthermore, a mould is required for the manufacture of each wheel from synthetic material, the costs of which moulds are extremely high.

The object of the present invention is to remove the above noted objections to present designs by providing a sprocket-wheel, gear-wheel or like wheel substantially manufactured from synthetic material and comprising a hub and a toothed ring or the like affixed thereto in spaced concentric relationship therewith. The hub is divided along a plane which lies perpendicular to the centreline of the hub-boring such that the hub consists of two parts of substantially annular form, the opposing radial surfaces of which are each provided with an open and radially outward directed recess of substantially annular form and with an outwardly directed inner periphery of non-circular form. Both of said recesses jointly accommodate a member of substantially annular form which is affixed to the said toothed ring, in which the radially inward directed periphery of said member corresponds in form to the said outwardly directed inner peripheries of the recesses in the two hub parts. The two hub parts are affixed to one another by bolts or like fixing media to clamp the member affixed to the toothed ring therebetween in the recesses.

Thus, through the foregoing described arrangement, use is made of a number of standard parts for different diameters of shaft utilised therewith, and different embodiments of toothed rings and the like can be affixed to the appropriate hub parts.

In this manner, each toothed-ring can be affixed to a hub having a suitable boring therethrough for a particular shaft diameter and through which it is unnecessary for a separate mould to be made for each wheel having a different and certain peripheral form in order that the hub-boring of the wheel corresponds with the diameter of the shaft on which the wheel has to be mounted.

The total number of different moulds can thus be limited to a relatively small range thereof, and there no longer exists the necessity to hold more than a small number of different types of wheels in stock. The total inventory costs will therefore be considerably reduced.

It is known from the German "Gebrauchsmuster 7505288" to introduce a metal ring into the synthetic material forming the hub of such wheels in order to obtain better power transmission from the shaft to the wheel.

According to the present invention, the introduction of such a ring can be dispensed with since a metal ring is provided which is clamped between the two hub parts and the outer periphery of which is adapted to the inner periphery of the member affixed to the toothed ring, and the inner periphery of which corresponds with the periphery of the hub parts.

Thus during manufacture of the hub parts, the need no longer exists to first lay a ring into the concerned mould to enable the latter to be accommodated in the synthetic material, and through which expedient the manufacturing costs can be maintained lower.

The invention is now to be further described with respect to examples of embodiments thereof which are illustrated in the accompanying drawings in which.

Figure 1:
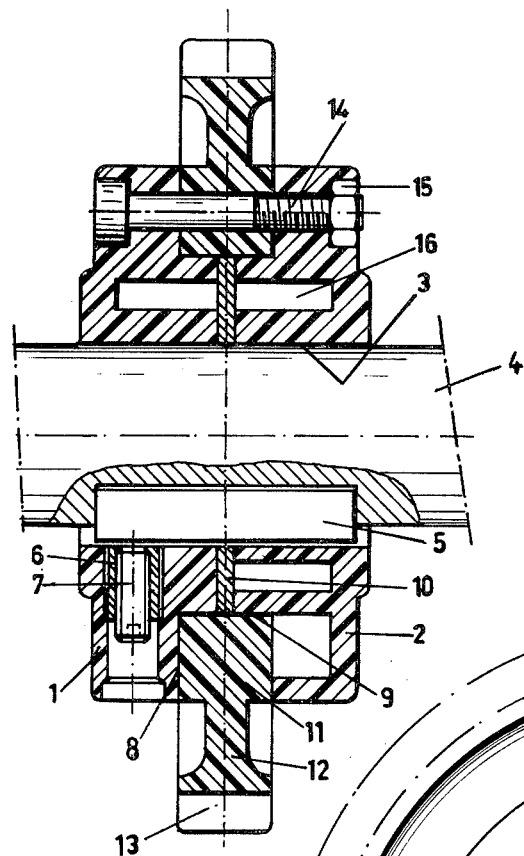
FIG. 1 shows an axial cross-section of a sprocket-wheel according to the invention.
Figure 2:
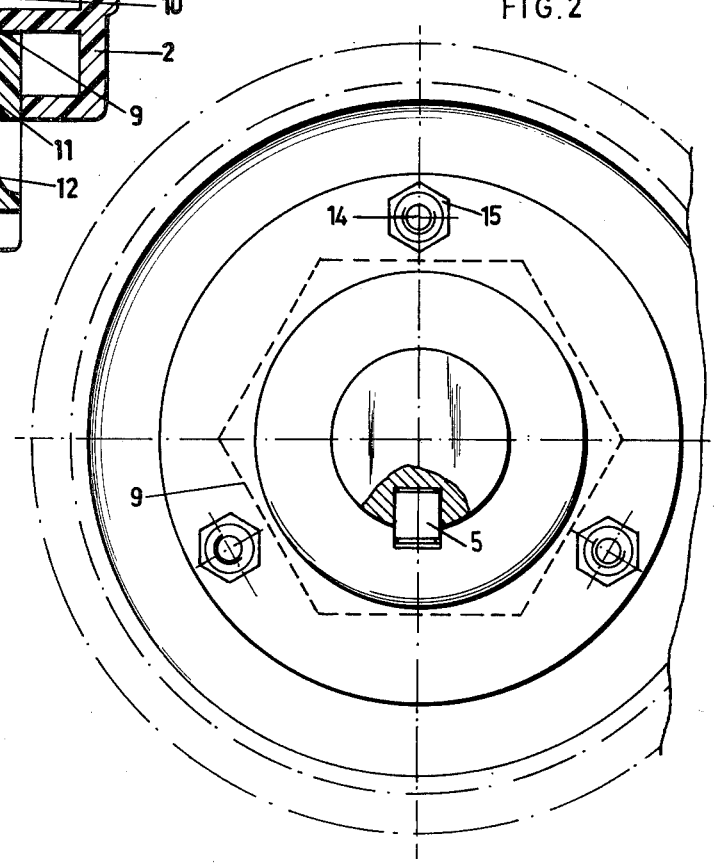
FIG. 2 shows a side elevation and partial cross-section of the sprocket-wheel of FIG. 1

The sprocket-wheel shown in FIGS. 1 and 2 comprises two hub parts 1 and 2 which are provided with a boring 3 for the accommodation therein of the shaft 4, and into which hub parts 1 and 2 and the shaft 4 a feather-key 5 is introduced to effect power transmission from the shaft 4 to the hub parts 1 and 2 or vice-versa. A bush 6 can be accommodated in the hub part 1 for the introduction therein of a set-screw 7 the purpose of which is to prevent axial movement of the wheel with respect to the shaft 4.

Each of the hub parts is provided with a recess 8,9, the internal peripheral form of which is hexagonal such as particularly shown in FIG. 2.

A metal disc 10 is arranged between the hub parts 1 and 2, the external peripheral form of which metal disc is also hexagonal and adapted to that of hub parts 1 and 2 so that the feather-key 5 thus also extends through the metal disc 10 in mating relationship therewith.

A member 11 of substantially annular form is accommodated in the recesses 8,9, in the hub parts 1 and 2, and which member 11 is affixed to the toothed-ring 13 by means of the joining part 12.

The hub parts 1 and 2 are affixed to one another by means of socket-bolts 14 and the nuts 15 screwed thereto.

Whilst naturally the force exercised on the hub parts 1 and 2 is transferred to the toothed wheel 13 via the bolts 14, the clamping force exerted on the member 11 and consequently via the part 12 on the toothed wheel 13, the force exercised by the shaft 4 on the toothed wheel 13 is transferred particularly by the metal disc 10 which, on one hand, is in fixed coupled relationship with the shaft 4 by means of the feather-key 5 and which external hexagonal periphery thereof, on the other hand, engages in mating relationship with the inner periphery of the opening in the member 11. Through this arrangement, the tendency for the synthetic material parts to turn somewhat with respect to one another, as the result of the elasticity of the material, is prevented in a simple manner.

In the course of time, such relative axial movement of the synthetic material parts could lead to a less rigid coupling between these synthetic material parts, the hub and the toothed ring.

As shown in FIG. 1, annular recesses 16 may possibly be provided locally in the hub parts 1 and 2 as a material saving measure and to facilitate ease of manufacture.

Figure 3:
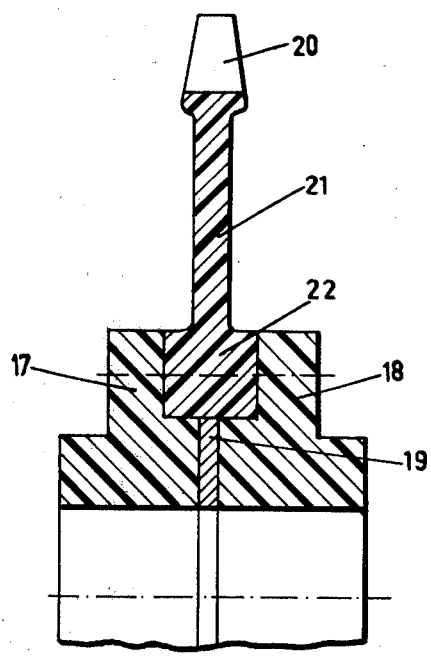
FIG. 3 shows a partial cross-section of another embodiment of the sprocket-wheel according to the invention.

FIG. 3 shows yet another embodiment of a sprocket-wheel according to the present invention, and in which use is made of two hub parts 17 and 18 with a metal disc 19 and a toothed ring 20 lying therebetween and the latter of which is affixed to the outer lying member 22 by means of the disc or possibly by spokes such as 21, and which outer lying member 22 is accommodated between the hub parts 17 and 18. The details of this embodiment are self explanatory and thus will not be further enlarged upon.

Whilst in the foregoing description it has been stated that the recesses in the hub parts 1 and 2 are of hexagonal form, and thus the inner periphery of the opening in member 11, it will be clear that the invention is not limited hereto. Good use can also be made of a substantially fully circular opening which, however, has a straight chordal portion somewhere along the periphery, and which straight chordal portion prevents the rotation of the toothed-ring with respect to the hub parts. It is also possible to provide axially arranged teeth on the surface of the recess and the internal peripheral surface of the opening in the member 11 or in the member 22. Indeed it is likewise possible to affix the hub parts 1, 2, 17 and 18 to the shaft 4 in this manner. All these possibilities however will be evident to those skilled in the art.

What I claim is:

1. A sprocket-wheel, gear-wheel or like wheel substantially manufactured from a synthetic material and comprising a hub and a toothed ring or the like affixed thereto in spaced concentric relationship therewith, said hub being divided along a plane which lies substantially perpendicular to the centre-line of the hub-boring such that the hub comprises two parts of substantially annular form, the opposing radial surfaces of which are each provided with an open and radially outward directed recess of substantially annular form and with an outwardly facing periphery of non-circular form, in which both said recesses jointly accommodate a part of substantially annular form which is affixed to the said toothed ring, in which the radially inwardly facing periphery of said part corresponds in form to the said outwardly facing peripheries of the recesses in two hub parts, and in which the two hub parts are affixed to one another by fixing means which also clamps the said part affixed to the toothed ring therebetween in the recesses.

2. A sprocket-wheel, gear-wheel or like wheel according to claim 1, in which a metal ring is clamped between the said two hub parts, the outer periphery of which metal ring is shaped to match the inner periphery of the part affixed to the toothed ring, and the inner periphery of the metal ring corresponds with the inner periphery of the hub parts.

3. A sprocket-wheel, gear-wheel or like wheel according to claim 2, wherein the two hub parts, said toothed ring and said part affixed to the toothed ring are all of a synthetic material.

4. A sprocket-wheel, gear-wheel or like wheel according to any one of claims 1, 2 or 3, the fixing means being bolts passing through both the hub parts and the said part affixed to the toothed wheel.

* * * * *